(12) United States Patent  
Masuzawa

(10) Patent No.: US 8,506,487 B2
(45) Date of Patent: Aug. 13, 2013

(54) ULTRASOUND IMAGING DEVICE

(75) Inventor: Hiroshi Masuzawa, Machida (JP)

(73) Assignee: Hitachi Medical Corporation, Tokyo (JP)

( * ) Notice: Subject to any disclaimer, the term of this patent is extended or adjusted under 35 U.S.C. 154(b) by 236 days.

(21) Appl. No.: 12/673,835

(22) PCT Filed: Aug. 20, 2008

(86) PCT No.: PCT/JP2008/064801
§ 371 (c)(1),
(2), (4) Date: Feb. 17, 2010

(87) PCT Pub. No.: WO2009/028366
PCT Pub. Date: Mar. 5, 2009

(65) Prior Publication Data
US 2011/0098565 A1    Apr. 28, 2011

(30) Foreign Application Priority Data
Aug. 27, 2007  (JP) .................. 2007-219188

(51) Int. Cl.
*A61B 8/00*  (2006.01)

(52) U.S. Cl.
USPC ............ 600/443; 600/407; 600/437; 600/447

(58) Field of Classification Search
USPC ................. 600/407, 437, 443–447; 382/128
See application file for complete search history.

(56) References Cited

U.S. PATENT DOCUMENTS

| | | | |
|---|---|---|---|
| 6,210,328 | B1 | 4/2001 | Robinson et al. |
| 2003/0216645 | A1* | 11/2003 | Yao et al. .................. 600/437 |
| 2005/0215893 | A1* | 9/2005 | Barnes et al. ............... 600/437 |
| 2007/0123110 | A1* | 5/2007 | Schwartz .................... 439/638 |

FOREIGN PATENT DOCUMENTS

| | | |
|---|---|---|
| JP | 2000-051210 | 2/2000 |
| JP | 2002-526225 | 8/2002 |
| JP | 2006-055282 | 3/2006 |
| JP | 2006-340890 | 12/2006 |

* cited by examiner

*Primary Examiner* — Tse Chen
*Assistant Examiner* — Joel F Brutus
(74) *Attorney, Agent, or Firm* — Antonelli, Terry, Stout & Kraus, LLP.

(57) ABSTRACT

A transmission/reception beamformer output provided with point spread functions having different wave number vector directions is used to obtain a compound image that is highly isochronous and sufficiently blurring-resistant.

17 Claims, 10 Drawing Sheets (1)

(2)

(1)

(2)

ULTRASOUND IMAGING DEVICE

BACKGROUND OF THE INVENTION

The present invention relates to an ultrasound imaging device having a beamformer that makes it possible to perform high-definition scanning.

In conventional medical ultrasound imaging systems, there are speckles formed from ensembles of fine scatterers which are smaller than the wave resolution of the systems in principle. In common B-mode imaging in which an attempt is made to recognize in vivo information by locating very small reflection intensity changes, luminance changes in relevant speckle signals are often nearly equivalent to that of reflection intensity changes useful for in vivo diagnosis. It is well-known problem that this equivalence makes it difficult to recognize the in vivo information.

There are several known methods which address the above problem. One method beamforms transmit and receive beam signals at multiple probe aperture positions and/or multiple imaging frequencies, and then adds the signals as coherent signals reserving carrier phase information. Another method provides a wave detection process after beamforming, and then adds the beamformed signals as incoherent signals from which the carrier phase information has been removed. The former method, which performs addition with coherent signals, is expected to reduce the size of the speckle by improving the diffraction limit of the transmission/reception aperture and increasing the frequency bandwidth. The latter method is widely known as so-called compound techniques. The compound techniques can be categorized into two types: "spatial compound technique" and "frequency compound technique." The "spatial compound technique" compounds signals from multiple probe aperture positions, whereas the "frequency compound technique" compounds multiple frequency band signals. As regards the "spatial compound technique," which compounds transmission/reception results obtained from multiple directions, the quality of a compounded image depends on a problem of blurring to be solved when the beams are compounded, which may be caused, for instance, by probe movement or improper sound velocity assumption. A relevant correction technology is disclosed, for instance, in JP-T No. 2002-526225.

BRIEF SUMMARY OF THE INVENTION

Problems with the conventional spatial compound technique will now be described with reference to FIGS. 3(1) to 3(5) and FIGS. 4(1) to 4(4). First of all, the problem with the homogeneity of a synthesized image will be described with reference to FIGS. 3(1) to 3(5). In a spatial compound scan, a transmission/reception beam derived from a transmission/reception aperture 400A of a probe 400 is scanned at multiple beam steered angles θ. The results of scanning are then synthesized. FIG. 3(1) is a schematic diagram illustrating a leftward steered scan (θ>0). FIG. 3(2) is a schematic diagram illustrating a head-on scan (θ=0). FIG. 3(3) is a schematic diagram illustrating a rightward steered scan (θ<0). FIG. 3(4) is a schematic diagram illustrating the synthesis result of scanning. Each of these figures additionally presents a conceptual enlarged view of point spread functions (psf, spatial distribution response of transmission/reception sensitivity, spatial sampling region) formed by a schematic transmission/reception beamformer in such a manner as to indicate a boundary line representing a level higher than a predetermined sound pressure level. The conceptual enlarged view of the point spread functions is characteristically drawn to reveal the anisotropic natures of a main lobe on a sound axis of a beam, sidelobes in the direction of distance (four sidelobes before and after the main lobe in the direction of transmitted sound wave propagation), and sidelobes in the azimuth direction orthogonal to the direction of distance (four sidelobes to the right and left of the main lobe in the direction of transmitted sound wave propagation). In relation to an point $P_0$ in the image, point spread function $psf_1$ on beam $B_1$ in the leftward steered scan shown in FIG. 3(1), point spread function $psf_2$ on beam $B_2$ in the head-on scan shown in FIG. 3(2), and point spread function $psf_3$ on beam $B_3$ in the rightward steered scan shown in FIG. 3(3) are synthesized while allowing them to retain different spatial distributions as shown in FIG. 3(4).

When synthesis is performed as shown in FIG. 3(5), the observation of an overall scanned image causes noticing that the number of overlapping scanning beams varies from one scanned image region to another, thereby providing the results of point spread function synthesis with different anisotropic natures (spatial spreading). Region $Z_1$, which includes a point $P_1$ made of point spread function $psf_1$ only, region $Z_4$, which includes a point $P_4$ made of only point spread function $psf_3$ whose spatial spreading is left-right reversal of point spread function $psf_1$, region $Z_2$, which includes a point $P_2$ made of point spread functions $psf_1$ and $psf_2$, and region $Z_4$, which includes a point $P_3$ made of point spread functions $psf_2$ and $psf_3$ and has a point spread function whose spatial spreading is left-right reversal of the counterpart in region $Z_2$, are generated in addition to the most desirable region $Z_0$, which includes a point $P_0$ synthesized by three point spread functions $psf_1$, $psf_2$, $psf_3$. The conventional technology has a problem to be solved in that the generation of regions $Z_0$, $Z_1$, $Z_2$, $Z_3$, and $Z_4$, which differ in point spread function synthesis characteristics, is unavoidable no matter what beam steering format is used for scanning.

A "blurring," which is caused by the movement of a probe or the living-body motion relative to the probe, will now be described with reference to FIGS. 4(1) to 4(4). As indicated schematically in FIG. 4(1), it is assumed that the entire scanning format (scanning beam group) moves toward point $P_0$ within an image at a predetermined velocity v and in parallel with the direction of aperture scanning. It is assumed that a reflector, which is at position $P_0(T_1)$ on beam $B_1$ at time instance $T_1$, moves to position $P_0(T_2)$ on beam $B_2$ at time instance $T_2$ as shown in FIG. 4(2), and moves to position $P_0(T_3)$ on beam $B_3$ at time instance $T_3$ as shown in FIG. 4(3). As a result of relative motion at velocity v, the centers of point spread functions synthesized at point $P_S$ on the image are shifted from each other by approximately $v \times (T_2-T_1)$ when synthesized. When these point spread functions are subjected to coherent addition or incoherent synthesis, the resulting image is blurred due to the spatial positional displacement of point spread functions $psf_1(T_1)$, $psf_2(T_2)$, and $psf_3(T_3)$. Signals of transmission/reception beams differing in probe aperture position, which are used for multiple transmissions as shown in FIGS. 4(1) to 4(4), may fail to agree with a spatial position serving as an intended synthesis reference due to probe movement or relative motion. In addition, even when there is no relative motion, the sound ray path and propagation time of a transmission/reception beam may unexpectedly vary due, for instance, to local variation in sound velocity of living-body. When multiple transmissions are to be used for spatial synthesis, it is necessary to reduce the degree of deterioration due to a "blurring" that may occur when beamformed outputs are subjected to coherent signal addition or incoherent signal synthesis.

If a head-on scan is performed as shown in FIG. 3(2) after completion of a leftward steered scan shown in FIG. 3(1), and then a rightward steered scan is performed as shown in FIG. 3(3) after completion of the head-on scan shown in FIG. 3(2), the scanning time intervals between the beams associated with the synthesis of the same point $P_0$ are long. To minimize the influence of the aforementioned movement and relative motion, it is preferred that the above-mentioned scanning time intervals be minimized. Further, when multiple transmission/reception beams are to be synthesized, it is necessary to use a transmission/reception beam signal synthesis method that is not easily affected by sound ray path changes in local in vivo sound velocity. Further, when a conventional spatial compound synthesis method is used, different effects may be unexpectedly produced depending on the orientations of and the distance between transmission/reception beams in multiple directions. Moreover, the use of the conventional spatial compound synthesis method makes it difficult to use the same number of beams for synthesis within the entire imaging region or achieve smooth synthesis.

Next, as regards the spread of speckle, it is known that the statistical shape of speckle significantly depends on the shape of a point spread function. The sound pressure distribution of point spread functions can be estimated by transmission/reception pulse waveform in the direction of distance or performing a Fourier transform of the sound pressure distribution at an aperture with respect to a focal point in the azimuth direction orthogonal to the direction of distance. In general, a dominant wave number vector direction of a point spread function (the direction of time-dependent amplitude peak arrangement of a traveling wave at an instantaneous point of time) is represented by a beam sound axis. The shape of a point spread function becomes significantly wide in the azimuth direction compared with the axial direction of the sound beam as the distance from the probe aperture increases. When, for instance, a large angle is formed between the direction in which the reflection of a living-body tissue boundary continues and the direction in which distribution of point spread function of beams spreads (the beam sound axis and the azimuth axis orthogonal to the beam sound axis), the boundary of speckle is transversely formed so that the boundary is often obscured when it is detected. When the conventional spatial compound technique is used, transmission/reception signals that have different incidence angles and are oriented in beam direction are synthesized while the direction of a point spread function beam sound axis is rotated. Synthesis is performed among changed sharp minimum luminance points derived from ultrasound wave interference. This not only improves the ratio between the variance and average of speckle image luminance distribution, but also alleviates the anisotropic nature, that is, the tendency toward characteristic spreading in the direction of a particular beam sound axis. However, the synthesis is a fixed, uniform process that is not associated with a local image formed by a signal reflected from in vivo tissues. Therefore, the degree of improvement considerably depends on the employed beam scanning method. In view of these circumstances, it is preferred that a sample be derived from a point spread function that reflects the local structure of a in vivo tissue boundary.

Further, in a conventional scan, the beamformer generally performs a beamforming process on a projection viewed in a direction perpendicular to an image, which might depend on a beam steered angle, in such a manner as to form a point spread function by essentially using a beam sound axis as the axis of line symmetry. In a sector scan, a convex scan, a trapezoidal scan, or other scan including a polar coordinate scan, the shape of speckle is spreading along polar coordinates unlike a linear scan or other orthogonal coordinate scan. When images are to be entirely interpreted, it is necessary to consider the anisotropic nature of the spreading of speckle and locate the region of interest in the polar coordinates. The anisotropic nature of the spreading of speckle invokes multiplicative noise in accordance with the polar coordinates brought about by an imaging system. Therefore, in some cases where the speckle is spread in the direction of orthogonal coordinates of a rectangular display region, it is easy to intuitively grasp the entire image. The above-described problems occur because the conventional technology uses a point spread function that is mainly determined by sound pressure amplitude distribution in the aperture and frequency and is line-symmetric with respect to a transmission/reception beam sound axis. Therefore, when the transmission/reception aperture is viewed from a particular point within an image to obtain effective point spread functions through mutual synthesis of them, it is necessary to synthesize transmission/reception signals having significantly different steered angles of beam sound axis (having considerably different crossing angles at such a point). Thus, it is likely that considerable influence will be experienced when displacement occurs due to relative motion or when an actual in vivo propagation path deviates from a sound ray path assumed from uniform sound velocity. Further, it is difficult to set up the point spread function in consideration of in vivo reflector distribution characteristics. In view of the above-described circumstances, it is necessary to control the anisotropic nature (control the axial direction, which serves as the reference of spreading, and the wave number vector direction) of point spread function distribution with respect to the same point.

The present invention achieves the above-described object when transmission pulses or reception beamforming point spread functions are subjected to coherent addition or incoherent synthesis by using those which differ in directions of dominant wave number vectors within an imaging plane at the same focal center and have rotated different anisotropic natures in such a manner that spatial samples based on ultrasonic pulses, which may be obtained during spatial synthesis, can be added or synthesized by transmission/reception beams that have close transmission/reception time instances of one another.

The present invention also provides a technology that conducts a desirable spatial sampling operation wherever possible at a finite aperture diffraction limit or within a finite frequency band or changes the direction of speckle flow in accordance with the characteristic anisotropic nature of local reflector spatial distribution by performing coherent addition or incoherent synthesis in accordance with local reflector distribution or performing adaptive coherent addition or incoherent synthesis independently of beam scanning.

The present invention makes it possible to provide enhanced isochronism between signals of beams to be added or synthesized, and reduce the degree of image deterioration due to the aforementioned "blurring."

The present invention also makes it possible to control the statistical anisotropic nature of speckle formation by regulating the anisotropic nature (wave number vector direction) of a point spread function, and form an easy-to-recognize image by generating an image having a spreading speckle pattern independent of a beam scanning format.

DETAILED DESCRIPTION OF THE INVENTION

Embodiments of the present invention will now be described.

First Embodiment

Figure 2:
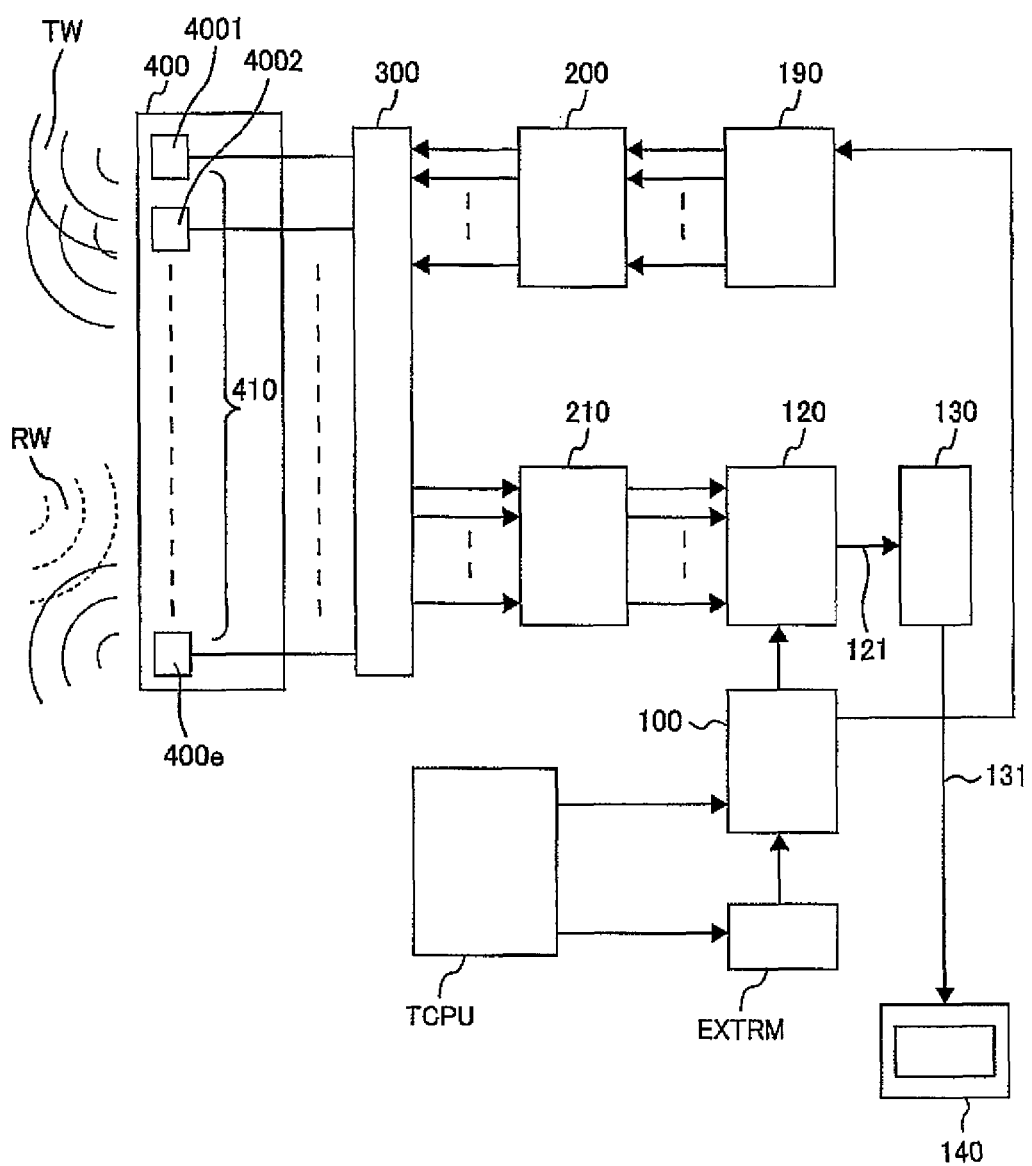
FIG. 2 is a diagram illustrating the configuration of a medical ultrasound imaging device according to the present invention (first embodiment).

FIG. 2 shows the configuration of an ultrasound imaging device according to the present invention. A probe 400, which transmits and receives ultrasound waves, incorporates a transmission/reception element group 410 formed by transmission/reception elements 4001, 4002-400e that provide electroacoustic conversion. In most cases, the transmission/reception elements 4001, 4002-400e are made of piezoelectric materials or other ferroelectric materials that generates a pressure from a voltage when transmitting an ultrasound wave and generates a voltage from an ultrasound wave pressure when receiving an ultrasound wave. As is well known, an ultrasound imaging device gives different voltage waveforms to the transmission/reception group 410 to emit a transmission sound wave TW into a living-body, which is a subject, receives a reception sound wave (echo) RW, which is reflected from a specific point of the living-body, compensates for the arrival time difference and phase difference between the reflected sound waves, and adds up the results of compensation to reconstruct a living-body image. Signals reflected from specific focal points acquired by the individual elements of the transmission/reception element group 410 are properly phase-compensated and then built up during summation. Meanwhile, signals reflected from undesired directions are interfered with each other and suppressed during summation to form an acoustic beam and scan in vivo information to produce an image. When an ultrasound wave is to be transmitted, a waveform for each channel is generated in accordance with the transmission delay time (transmission time) and amplitude output information concerning each transmission channel output from a beamformer data computation section 100 so that a transmission beamformer 190 acquire a desired point spread function at a focal point. This is accomplished when a pulse transmission circuit 200 supplies a transmission voltage having a waveform generated by the transmission beamformer 190 to the transmission/reception element group 410 in the probe 400 through a transmission/reception separation circuit 300. An ultrasound wave is transmitted after a voltage is converted to a pressure by the transmission/reception element group 410. The ultrasound wave transmitted from the probe 400 is reflected from the interior of the subject. The reflected wave is then received again by the transmission/reception element group 410 of the probe 400, subjected to pressure-to-voltage conversion, and input into a reception circuit 210 through the transmission/reception separation circuit 300. The reception circuit 210 subjects the signal of a reception channel to amplification and band limitation, and then supplies the resulting signal to a reception beamformer 120. In accordance with output information about delay time and weight, which is output from the beamformer data computation section 100, the reception beamformer 120 forms a beam output signal 121 the directionality of which is provided by the synthesis of time and amplitude. The beam output signal 121 is input into a scan converter 130, converted to a video signal 131, and used to display, for instance, a real-time tomographic image or stereoscopic image on a display section 140. A processor TCPU not only provides overall control over the system, but also writes beamformer data in an attached storage section EXTRAM through the beamformer data computation section 100. The storage section EXTRAM can be implemented, for instance, by using a static random access memory (hereinafter referred to as the SRAM).

An imaging technology for performing a linear scan with a group of different point spread functions on the same transmission/reception beam will now be described with reference to FIGS. 1(1) to 1(4).

Figure 1:
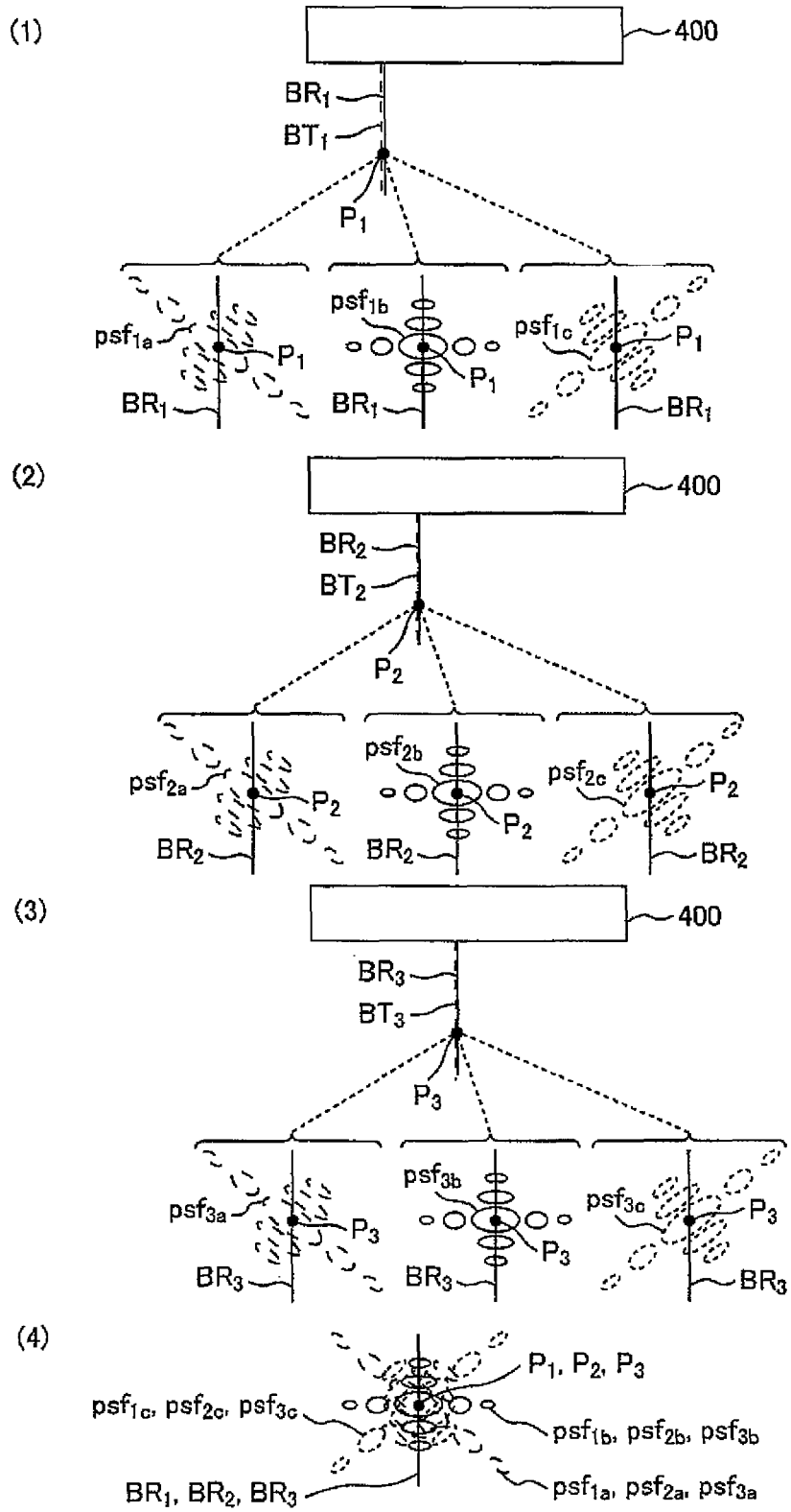
FIGS. 1(1) to 1(4) are diagrams illustrating a technology of spatial synthesis by multiple transmitted point spread functions (first embodiment).
Figure 3:
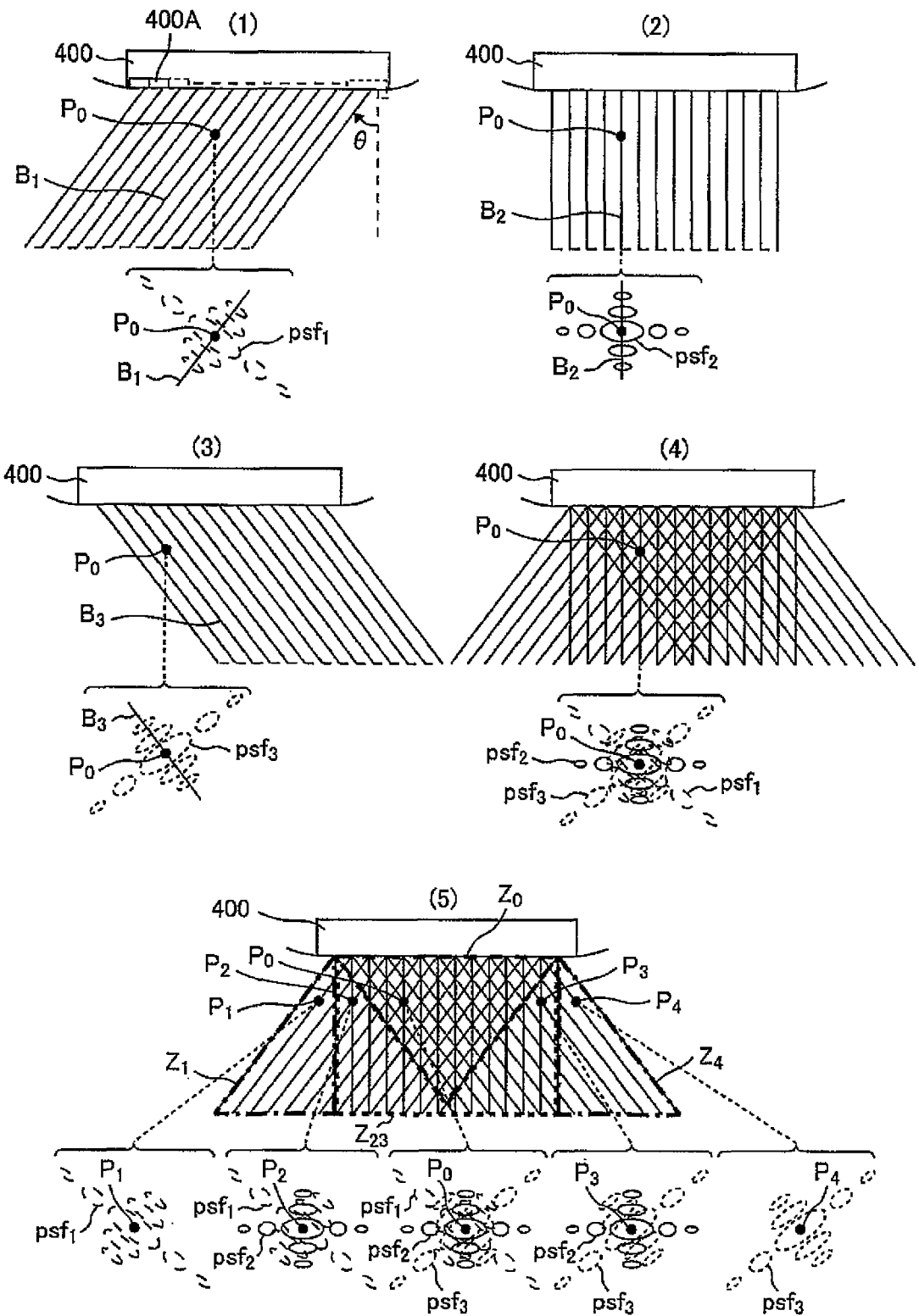
FIGS. 3(1) to 3(5) are diagrams illustrating a conventional spatial synthesis technology.
Figure 4:
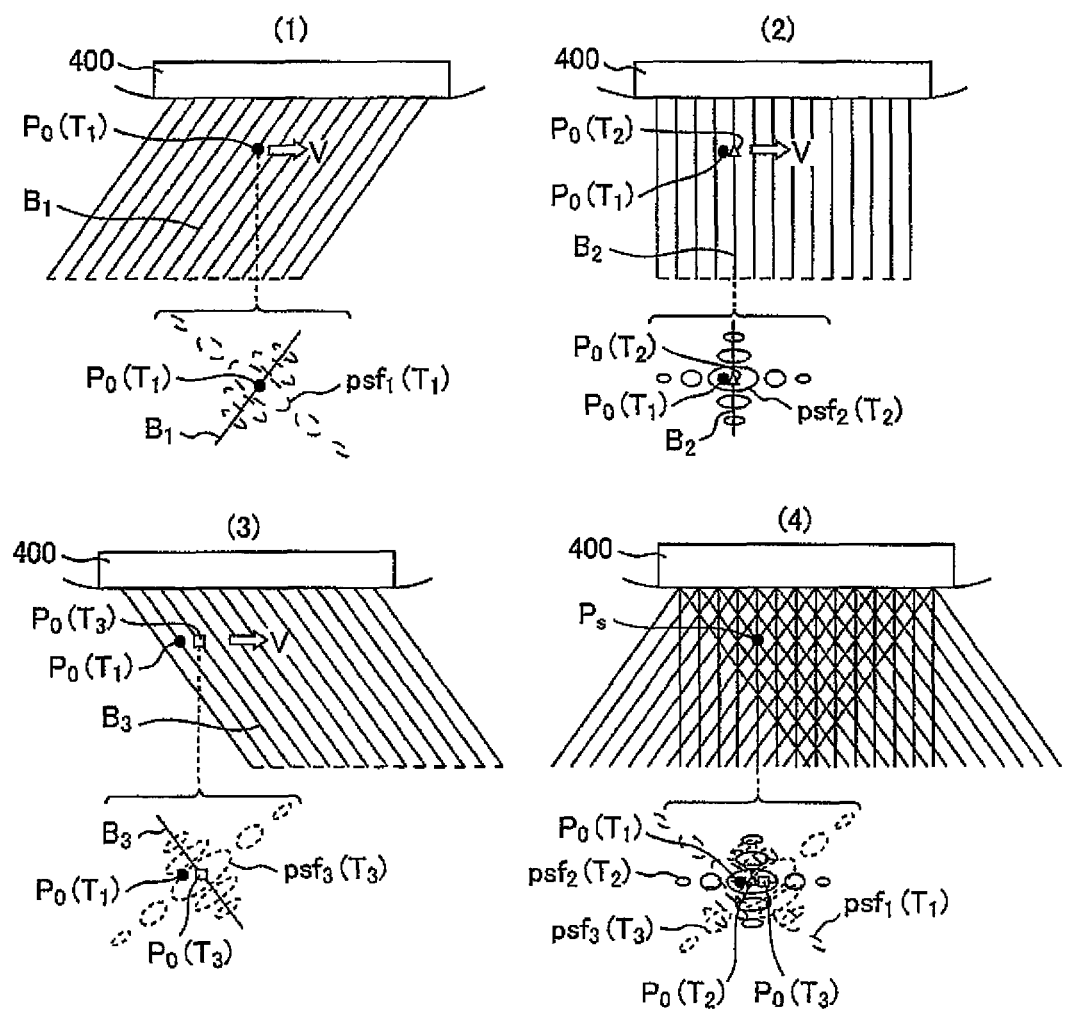
FIGS. 4(1) to 4(4) are diagrams illustrating problems with the conventional spatial synthesis technology.

FIG. 1(1) is a schematic diagram illustrating a case where the probe 400 makes a linear scan to synthesize an image by performing a number of transmission/reception cycles in each beam direction. A transmission beam $BT_1$ and a reception beam $BR_1$ are formed at the same scan beam position (transmission/reception aperture position). The transmission beamformer 190 and reception beamformer 120 shown in FIG. 2 operate so as to form point spread function $psf_{1a}$ in relation to point $P_1$ on the first transmission/reception cycle, form point spread function $psf_{1b}$ in relation to point $P_1$ on the second transmission/reception cycle, and form point spread function $psf_{1c}$ in relation to point $P_1$ on the third transmission/reception cycle. It is assumed that point spread functions $psf_{1a}$, $psf_{1b}$, and $psf_{1c}$ serve as a group of multiple point spread functions and spread in different dominant wave number vector directions like point spread functions $psf_1$, $psf_2$, and $psf_3$ in FIGS. 3(1) to 3(5) in order to produce an effect similar to that of imaging based on spatial synthesis from different transmission/reception aperture positions. More specifically, one or more of these point spread functions have an asymmetrical spatial spreading in a direction parallel to the direction of the transmission beam $BT_1$ and reception beam $BR_1$ (in a direction side by side or beam sound axis direction) and in a direction orthogonal to the direction of the transmission beam $BT_1$ and reception beam $BR_1$ (in the array direction of the transmission/reception element group 410 of the probe or in an azimuth direction), as is the case with point spread functions $psf_{1a}$ and $psf_{1c}$. Further, in the case of point spread function $psf_{1b}$, the direction of a dominant wave number vector component forming point spread function $psf_{1b}$ (the direction of wave amplitude peak arrangement at an instantaneous point of time) is along (parallel to) the direction of the transmission beam $BT_1$ and reception beam $BR_1$. In the case of point spread functions $psf_{1a}$ and $psf_{1c}$, however, the direction of the dominant wave number vector component is rotated through a predetermined angle relative to point $P_1$. Although point spread functions $psf_{1a}$, $psf_{1b}$, and $psf_{1c}$ are formed respectively at the same transmission/reception aperture position, they differ from each other in the direction of the dominant wave number vector component. For example, point spread function $psf_{1b}$ is obtained when the signals of the transmission/reception element group 410 in the transmission/reception aperture are provided with transmission and reception sensitivities (amplitudes) left-right symmetrical from the center on the basis of the same time pulse waveform by using point $P_1$ as a beamforming focal point, and also provided with left-right symmetrical delay time. On the other hand, point spread functions $psf_{1a}$ and $psf_{1c}$ are obtained when the signals of the transmission/reception element group 410 in the transmission/reception aperture are subjected to frequency-dependent asymmetrical beamforming from the aperture center. The reception beamformer 120 applies dynamic variations to phase difference and weight in dependence on frequency components during reception.

Referring to FIG. 1(2), the transmission/reception aperture position moves so that a transmission beam $BT_2$ and a reception beam $BR_2$ are formed again at the same scan beam position. The transmission beamformer 190 and reception beamformer 120 shown in FIG. 2 operate so as to form point spread function $psf_{2a}$ in relation to point $P_2$ on the first transmission/reception cycle, form point spread function $psf_{2b}$ in relation to point $P_2$ on the second transmission/reception cycle, and form point spread function $psf_{2c}$ in relation to point $P_2$ on the third transmission/reception cycle. Referring to FIG. 1(3), the transmission/reception aperture position moves so that a transmission beam $BT_3$ and a reception beam $BR_3$ are formed again in the same direction. The transmission beamformer 190 and reception beamformer 120 shown in FIG. 2 operate so as to form point spread function $psf_{3a}$ in relation to point $P_3$ on the first transmission/reception cycle, form point spread function $psf_{3b}$ in relation to point $P_3$ on the second transmission/reception cycle, and form point spread function $psf_{3c}$ in relation to point $P_3$ on the third transmission/reception cycle. These processes are the same as indicated in FIG. 1(1) except that the aperture position is moved. It is assumed that points $P_1$, $P_2$, and $P_3$ are at the same distance from the aperture. At an imaging stage, point spread functions having different dominant wave number vector component directions are used around points $P_1$, $P_2$, and $P_3$ as shown in FIG. 1(4). In an addition process (coherent addition) before wave detection, characteristically strong wave number vector components interfere with each other in directions parallel to the directions of reception beams $BR_1$, $BR_2$, and $BR_3$ (transmission beams $TR_1$, $TR_2$, and $TR_3$) so that point spread functions $psf_{1b}$, $psf_{2b}$, and $psf_{3b}$ come closer to a less anisotropic response around points $P_1$, $P_2$, and $P_3$. As a result, the aspect ratio of speckle changes. In synthesis after wave detection, the dominant wave number vector component directions of the point spread functions form different angles so as to reduce the correlation between the reflections from seemingly uniform scatterers. This decreases the ratio of variance of speckle luminance to its average. In a situation where there is no specular component of a reflector (a large number of spatially uniform scatterers exist in a main volume of point spread functions), the expected value of a signal correlation coefficient decreases when the wave number vector component directions change to become mutually orthogonal. When, for instance, the dominant wave number vector component directions of point spread functions $psf_{1b}$ and $psf_{3b}$ are mutually orthogonal, it is expected that the speckle will be reduced. Although FIGS. 1(1) to 1(4) show examples of synthesis from three different point spread functions, any number of point spread functions can be set.

The point spread functions shown in FIGS. 1(1) to 1(4) represent the effects of both the transmission beamformer 190 and reception beamformer 120. When a transmission cycle is performed n times at each beam position, the imaging time substantially increases n times in accordance with the number of times the transmission cycle is repeated. Therefore, the frame rate decreases as far as the intervals between individual beam positions remain unchanged.

As a method of avoiding a decrease in the frame rate, the reception beamformer 120 can perform effectively n different processes in relation to one transmission of the transmission beamformer 190 in a situation where a transmission/reception cycle is performed once at each aperture position instead of n times with the processing capacity of the reception beamformer 120 increased n times. Causing the reception beamformer 120 to perform a number of different processes in relation to a reception signal based on one transmission is hereinafter referred to as the use of "reception multiple beams."

Figure 5:
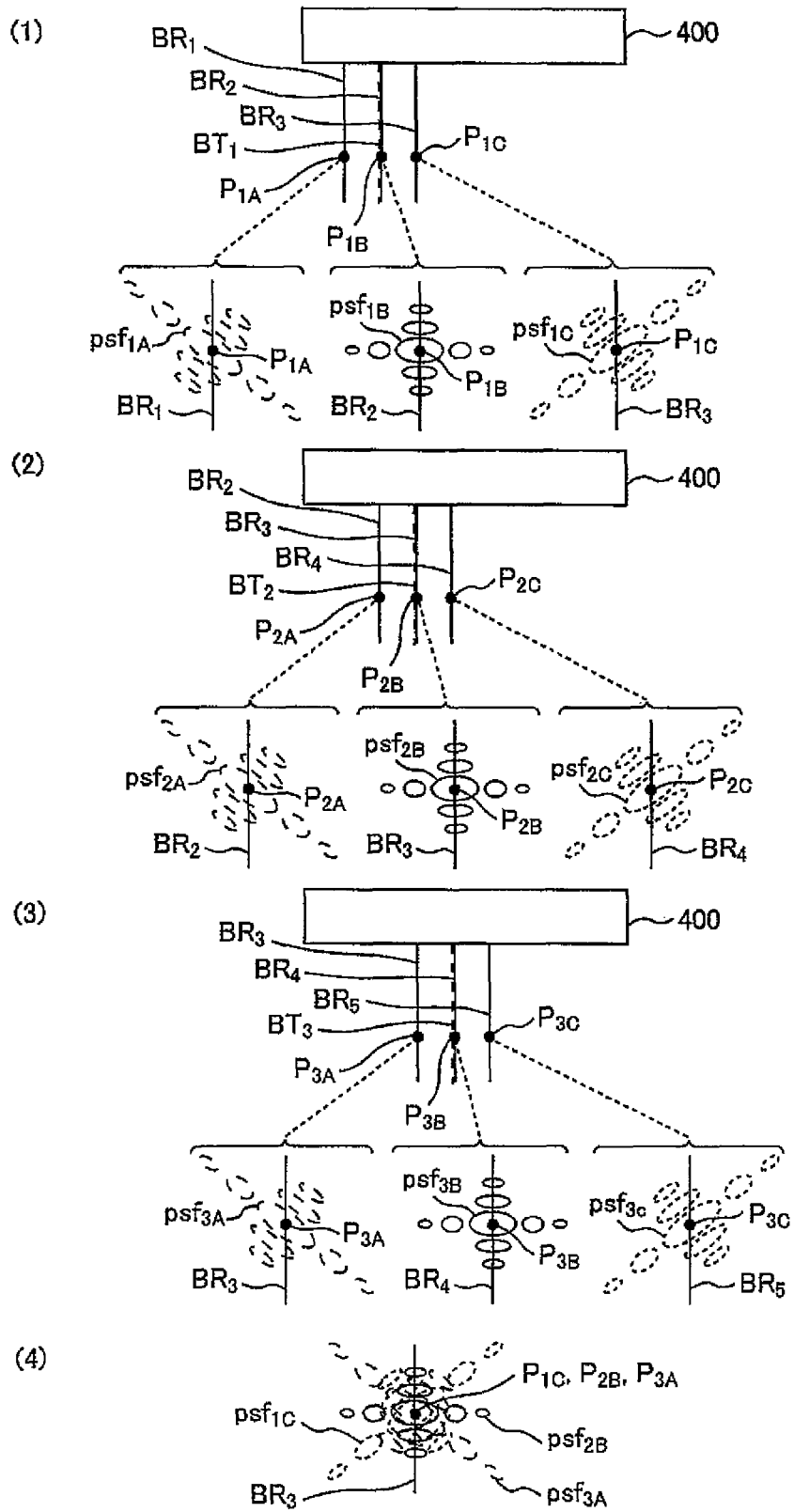
FIGS. 5(1) to 5(4) are diagrams illustrating a technology of spatial synthesis by multiple parallel received point spread functions (first embodiment).

An example of high-speed processing with reception multiple beams will now be described with reference to FIGS. 5(1) to 5(4). FIG. 5(1) is a schematic diagram illustrating a case where the probe 400 makes a linear scan so as to synthesize an image with three (n=3) reception multiple beams in each transmission beam direction. Three reception multiple beams $BR_1$, $BR_2$, $BR_3$ are formed around a transmission beam $BT_1$. Reception beam $BR_2$, which is one of the three reception multiple beams, is formed in substantially the same direction. The number (n) of reception multiple beams is not limited to three (three different point spread functions). Any number of reception multiple beams can be set in accordance with the processing capacity of the reception beamformer 120.

The transmission beamformer 190 and reception beamformer 120 shown in FIG. 2 operate so that the point spread functions for points $P_{1A}/P_{1B}$, and $P_{1C}$ are $psf_{1A}$, $psf_{1B}$, and $psf_{1C}$, respectively. Here it is assumed that point spread functions $psf_{1A}$, $psf_{1B}$, and $psf_{1C}$ are spreading in different directions, like point spread functions $psf_1$, $psf_2$, and $psf_3$ in FIGS. 3(1) to 3(5), to produce the same effect as that of an imaging operation based on spatial synthesis. More specifically, one or more of these point spread functions, such as $psf_{1A}$ and $psf_{1C}$, have an asymmetrical spatial spreading in a direction parallel to the direction of reception beams $BR_1$ and $BR_3$ and in a direction orthogonal to the direction of reception beams $BR_1$ and $BR_3$.

Further, in the case of point spread function $psf_{1B}$, the direction of its dominant wave number vector component is parallel to the direction of reception beam $BR_1$. In the case of point spread functions $psf_{1A}$ and $psf_{1C}$, however, the directions of their dominant wave number vector components are rotated respectively through a predetermined angle relative to points $P_{1A}$ and $P_{1C}$. Although point spread functions $psf_{1A}$, $psf_{1B}$, and $psf_{1C}$ are formed respectively at the same transmission/reception aperture position, they differ from each other in the direction of the dominant wave number vector component. For example, point spread function $psf_{1B}$ is obtained when the signals of the transmission/reception element group 410 in the transmission/reception aperture are provided with transmission and reception sensitivities (weights) left-right symmetrical from the center on the basis of the same time pulse waveform by using point $P_{1B}$ as a beamforming focal point, and also provided with left-right symmetrical delay time. On the other hand, point spread functions $psf_{1A}$ and $psf_{1C}$ are obtained when the signals of the transmission/reception element group 410 in the transmission/reception aperture are subjected to different asymmetrical beamforming processes while the center of the aperture is regarded as the center of symmetry on an individual frequency basis. Further, the output of the transmission beamformer 190 preferably can care insertion loss during transmission/reception in consideration of the formation of point spread functions made from all reception multiple beams formed by the reception beamformer 120.

Referring to FIG. 5(2), the transmission/reception aperture position moves so that three reception multiple beams $BR_2$, $BR_3$, $BR_4$ are formed again around transmission beam $BT_2$. Transmission beam $BT_2$ and reception beam $BR_3$, which is one of the reception multiple beams, are formed in the same direction. The transmission beamformer 190 and reception beamformer 120 shown in FIG. 2 operate so that the point spread functions for points $P_{2A}$, $P_{2B}$, and $P_{2C}$ are $psf_{2A}$, $psf_{2B}$, and $psf_{2C}$, respectively. However, the processes are the same as indicated in FIG. 5(1) except that the aperture position is moved. Similarly, referring to FIG. 5(3), the transmission/reception aperture position moves so that three reception multiple beams $BR_3$, $BR_4$, $BR_5$ are formed again around transmission beam $BT_3$. Transmission beam $BT_3$ and reception beam $BR_4$ are formed in the same direction. As shown in FIG. 5(4), received signals based on point spread functions $psf_{1C}$, $psf_{2B}$, and $psf_{3A}$, which are $P_{3A}$, are acquired upon completion of three transmission/reception cycles and can be spatially synthesized. A reception beamformer output 121 forming point spread functions $psf_{1C}$, $psf_{2B}$, and $psf_{3C}$, which have different dominant wave number vector components in multiple directions, is synthesized. In a synthetic addition process (coherent addition) prior to wave detection, therefore, the wave number vector components of point spread function $psf_{2B}$ possessed in the direction of reception beam $BR_3$ interfere with each other to alleviate a characteristic anisotropic nature. Further, in an addition subsequent to wave detection, the directions of dominant wave number vector components of the point spread functions form mutually different angles. This produces a speckle reduction effect. In the above-described scan, the transmission aperture position moves with the intervals between the reception multiple beams equalized so that the positions of formed reception beams overlap with each other. Therefore, different point spread functions in the same reception beam direction can be acquired. Further, as the number of transmission cycles does not increase n times unlike the case shown in FIGS. 1(1) to 1(4), the frame rate does not decrease due to an increase in the transmission/reception time. In addition, as synthesis is based on temporally continuous transmission/reception, the degree of isochronism between reception beamformer outputs to be synthesized is higher than in the case of FIGS. 1(1) to 1(4).

Figure 6:
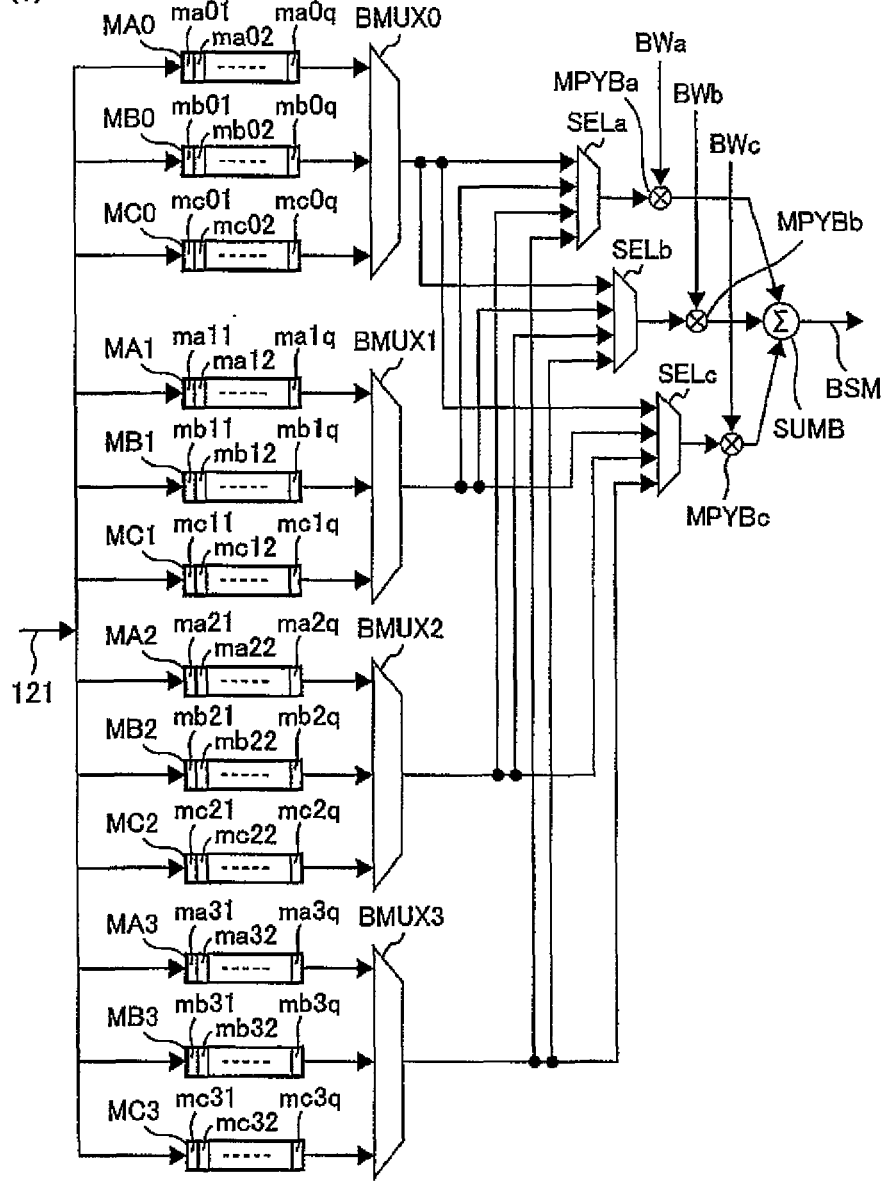
FIGS. 6(1) and 6(2) are diagrams illustrating a circuit of spatial synthesis by multiple parallel received point spread functions (first embodiment).

A function exercised by the scan converter 130 shown in FIG. 2 to perform a coherent addition process on a reception beamformer output 121 during a scan shown in FIGS. 5(1) to 5(4) will now be described with reference to FIGS. 6(1) and 6(2). FIG. 6(1) shows a typical configuration of a computation circuit for the coherent addition process. FIG. 6(2) is a time frame diagram illustrating the sequence of its synthesis operations. The following description assumes that the number (n) of reception multiple beams is three, as is the case with FIGS. 1(1) to 1(4) and FIGS. 5(1) to 5(4).

The reception beamformer output 121 includes a received signal ra that includes signals derived from point spread functions $psf_{1A}$, $psf_{2A}$, and $psf_{3A}$ in FIGS. 5(1) to 5(4), a received signal rb that includes signals derived from point spread functions $psf_{1B}$, $psf_{2B}$, and $psf_{3B}$ in FIGS. 5(1) to 5(4), and a received signal rc that includes signals derived from point spread functions $psf_{1C}$, $psf_{2C}$, and $psf_{3C}$ in FIGS. 5(1) to 5(4). Received signals ra, rb, and rc correspond, for instance, to signal names of time phases of time-series signals output as three-phase time-division signals. Received signals ra, rb, and rc are stored in individual beam memories MA0, MB0, MC0, MA1, MB1, MC1, MA2, MB2, MC2, MA3, MB3, MC3. Each of these memories has a space for q samples in a time-series direction, which is determined by the longest period of the time of a continuous reception and the data interval of reception beamformer output. The spaces of individual beam memories MA0, MB0, MC0, MA1, MB1, MC1, MA2, MB2, MC2, MA3, MB3, and MC3 are (ma01, ma02, . . . , ma0q), (mb01, mb02, . . . , mb0q), (mc01, mc02, . . . , mc0q), (ma11, ma12, . . . , ma1q), (mb11, mb12, . . . , mb1q), (mc11, mc12, . . . , mc1q), (ma21, ma22, . . . , ma2q), (mb21, mb22, . . . , mb2q), (mc21, mc22, . . . , mc2q), (ma31, ma32, . . . , ma3q), (mb31, mb32, . . . , mb3q), and (mc31, mc32, . . . , mc3q), respectively. For each transmission and each of reception multiple beams, the reception beamformer output 121 is stored in the individual beam memories MA0, MB0, MC0, MA1, MB1, MC1, MA2, MB2, MC2, MA3, MB3, MC3 in accordance with a write enable signal (not shown). As n=3 for each transmission, four sets of three individual memories (MA0, MB0, MC0), (MA1, MB1, MC1), (MA2, MB2, MC2), (MA3, MB3, MC3) are sequentially selected so that time-series values of reception multiple beam signals based on the same transmission are written in the respective sets in the order of ra, rb, rc. When transmission beam numbers are to be assigned to individual transmissions in the order of 1, 2, 3, and so on, the reception beamformer output 121 for transmission beam No. 1 repeatedly operates to write the time-series value of ra in MA0, the time-series value of rb in MB0, and the time-series value of rc in MC0. The reception beamformer output 121 for transmission beam No. 2 repeatedly operates to write the time-series value of ra in MA1, the time-series value of rb in MB1, and the time-series value of rc in MC1. The reception beamformer output 121 for transmission beam No. 3 repeatedly operates to write the time-series value of ra in MA2, the time-series value of rb in MB2, and the time-series value of rc in MC2. The reception beamformer output 121 for transmission beam No. 4 repeatedly operates to write the time-series value of ra in MA0, the time-series value of rb in MB0, and the time-series value of rc in MC0. When the above-described transmission cycle is repeated until individual beam memories MA3, MB3, and MC3 are written into, the above operation is repeated to overwrite the individual beam memories beginning with MA0, MB0, and MC0.

Memory selectors BMUX0, BMUX1, BMUX2, BMUX3, SELa, SELb, SELc output the contents of the individual beam memories MA0, MB0, MC0, MA1, MB1, MC1, MA2, MB2, MC2, MA3, MB3, MC3 to multipliers MPYBa, MPYBb, MPYBc. The multipliers MPYBa, MPYBb, MPYBc multiply the contents of individual beam memories by beam synthesis weighting factors BWa, BWb, BWc, respectively, and allow an adder SUMB to output a coherent addition signal BSM.

The operations of the above memory selectors will now be described with reference to FIG. 6(2). Each time the transmission beam number is incremented by one, the received signals (ra, rb, rc) are sequentially stored in the order of (MA0, MB0, MC0), (MA1, MB1, MC1), (MA2, MB2, MC2), (MA3, MB3, MC3), (MA0, MB0, MC0), (MA1, MB1, MC1), and so on. During a period of time during which the transmission beam number is between 1 and 3, no coherent addition signal BSM is output. During a period of time during which the transmission beam number is 4, the received signals ra, rb, rc are read from individual beam memories MA2, MB1, and MC0, respectively, from the period of time during which the transmission beam number is between 1 and 3, and supplied to the multipliers MPYBa, MPYBb, MPYBc. These multipliers multiply the received signals ra, rb, rc by the beam synthesis weighting factors BWa, BWb, BWc. The results of multiplication are then added together by the adder SUMB to obtain an output bsm1 of the coherent addition signal BSM. The beam synthesis weighting factors BWa, BWb, BWc may be changed in a time-series manner. Similarly, during a period of time during which the transmission beam number is 5, the received signals ra, rb, re are read from individual beam memories MA3, MB2, and MC1, respectively, from the period of time during which the transmission beam number is between 2 and 4, supplied to the multipliers MPYBa, MPYBb, MPYBc, multiplied by the beam synthesis weighting factors BWa, BWb, BWc, and added together by the adder SUMB to obtain an output bsm2 of the coherent addition signal BSM. Outputs bsm1 and bsm2 are signal packets having a length of q. Subsequently, a coherent addition is repeated upon each transmission. The outputs of the coherent addition signal BSM are converted to the video signal 131 shown in FIG. 2 through a wave detection/compression section, a filter section, or other section not shown.

Figure 7:
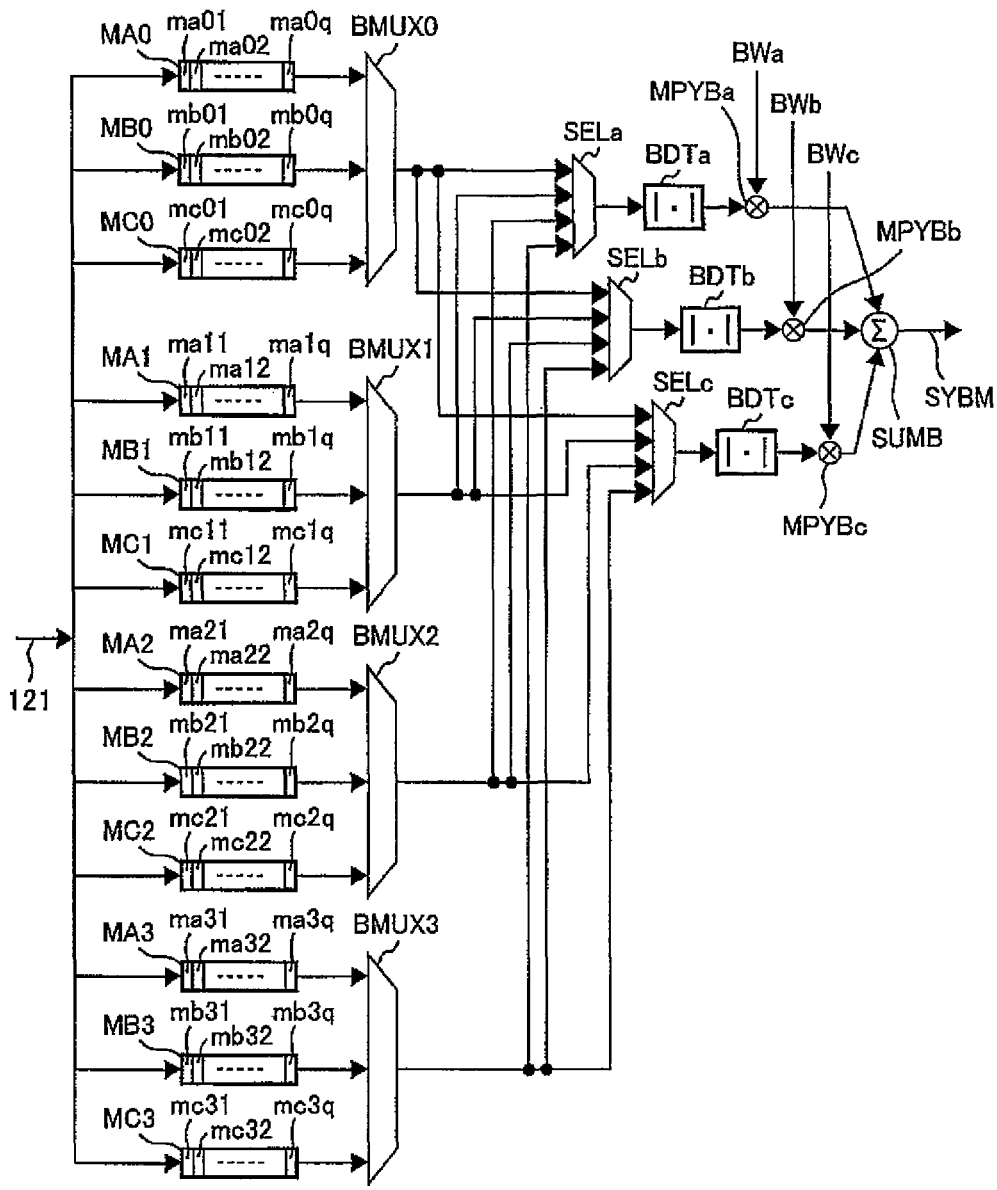
FIG. 7 is a diagram illustrating an incoherent spatial synthesis circuit (first embodiment).

An incoherent synthesis process (compound process), which the scan converter 130 shown in FIG. 2 performs in accordance with the reception beamformer output 121 by using one of its functions during the operation shown in FIGS. 5(1) to 5(4), will now be described with reference to FIG. 7. The configuration shown in FIG. 7 is such that wave detection/compression sections BDTa, BDTb, BDTc are inserted respectively between the memory selectors SELa, SELb, SELc and multipliers MPYBa, MPYBb, MPYBc shown in FIGS. 6(1) and 6(2). Wave detection/compression section BDTa is a nonlinear process section for generating luminance information that is without carrier phase information in the output of the reception beamformer 120. An alternative configuration may be employed so that a compression process, such as a logarithmic compression process, is not performed by the wave detection/compression sections BDTa, BDTb, BDTc, but is performed as needed after various computations on a final output SYMB.

Second Embodiment

Figure 10:
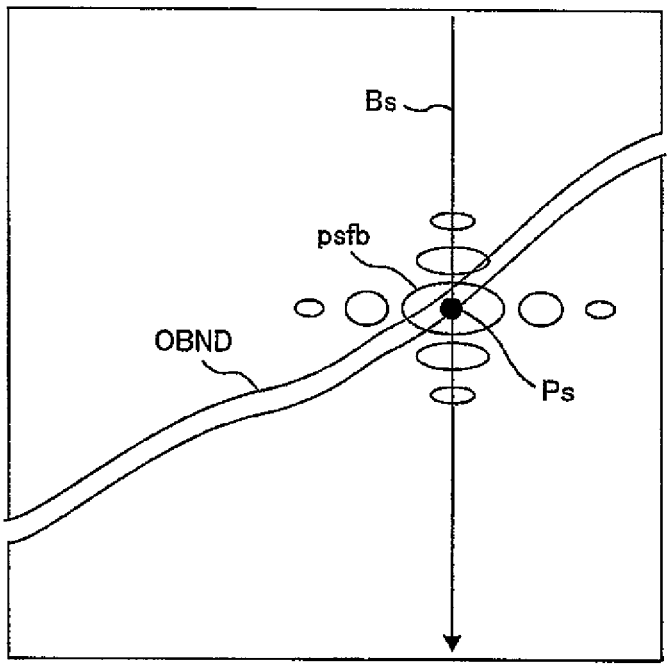
FIGS. 10(1) and 10(2) are diagrams illustrating adaptive spatial synthesis (second embodiment).
Figure 10:
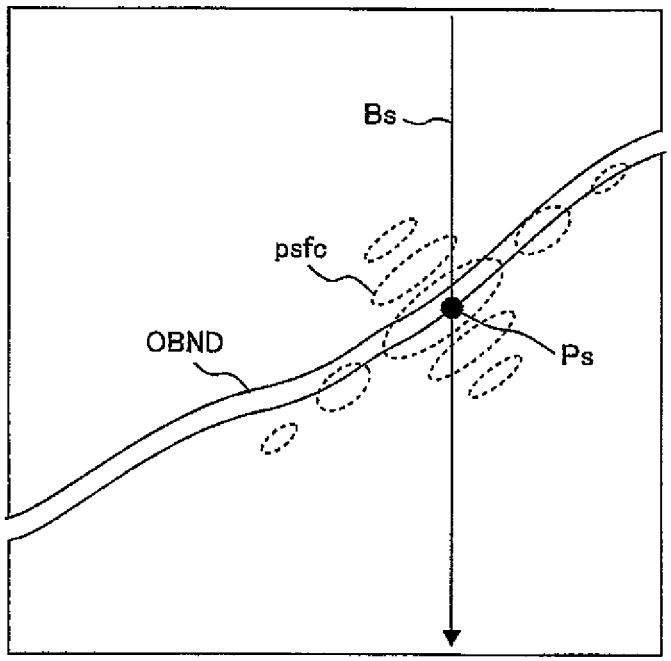

A typical configuration for enhancing the anisotropic nature of spatial sampling will now be described as a second embodiment. First of all, the principle of anisotropic nature enhancement will be described with reference to FIGS. 10(1) and 10(2). A case where a boundary OBND exists in an imaging region as shown in FIG. 10(1) to cause a strong reflector distribution change that is not orthogonal or parallel to a transmission/reception beam $B_S$ will be discussed. When a conventional technology was used, the same point spread function psfb was used at the same depth (at the same distance from the aperture) as point $P_S$ no matter whether the anisotropic nature of such reflection exists. Meanwhile, although the boundary OBND is long in a particular direction, the direction of the dominant wave number vector having the best spatial resolution of the point spread function psfb (the direction of the transmission/reception beam $B_S$) is not orthogonal to the direction in which the spatial resolution of the boundary OBND is high. Therefore, there is a tendency where an image in which the boundary OBND is blurred in the direction of the transmission/reception beam $B_S$ is formed. Except for phase inclination for beam orientation steered, the point spread function of a conventional beamformer that gives left-right symmetrical weight and phase within the aperture is spread in an azimuth direction orthogonal to the direction of the transmission/reception beam $B_S$ instead of the direction of transmission/reception beam $B_S$. Therefore, when point spread function psfb is changed to another point spread function that is centered around point $P_S$ and seemingly rotated along the direction of the boundary OBND, the image of the boundary OBND may be enhanced. If, for instance, in a situation where the transmission/reception beam $B_S$ is formed perpendicularly to the array direction of the transmission/reception element group 410, the reflector distribution near point $P_S$ is sampled with point spread function psfc, which is centered around point $P_S$ shown in FIG. 10(2), and the direction of a dominant wave number vector of the reflector distribution near point $P_S$ coincides with the direction of a dominant wave number vector of point spread function psfc, it is conceivable that the degree of correlation may increase to increase the reception beamformer output 121 and invoke image enhancement. When a point spread function is rotated or its inclination is changed as described above, the manner of spatial correlation changes locally, thereby enhancing the spatial distribution of a local reflector. It should be noted that the dominant wave number vector of a reflector distribution near point $P_S$ of an anatomical boundary OBND does not always coincide with point spread functions psfb and psfc. Therefore, an adaptive process or enhancement process dependent on the statistical fluctuation of a reflector distribution is performed.

Figure 9:
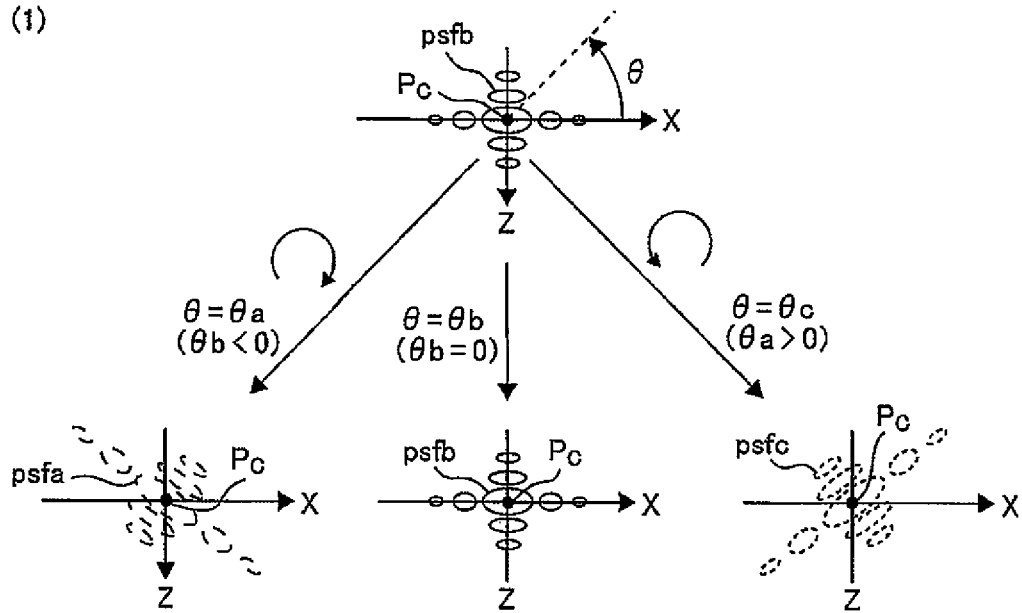
FIGS. 9(1) and 9(2) are diagrams illustrating adaptive spatial synthesis computations (second embodiment).
Figure 9:
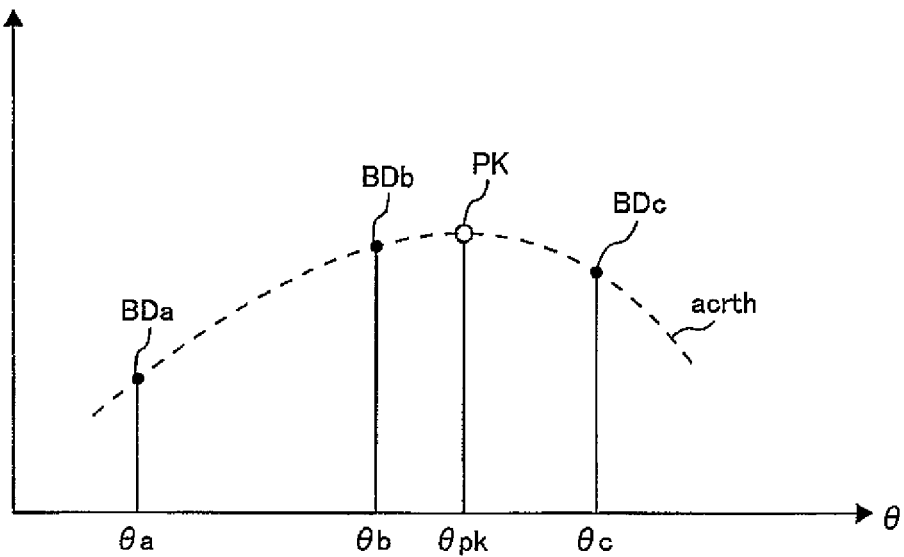

Point spread function psfc, which provides the highest degree of correlation with the transmission/reception beam $B_S$, is not known before transmission. It is therefore necessary to actually perform sampling with at least point spread functions corresponding to multiple rotated or inclined states in addition to point spread function psfc in FIG. 10(2). In reality, however, performing a large number of sampling operations with point spread functions corresponding to multiple rotated or inclined states imposes an excessive load on the reception beamformer 120. Therefore, a practical method would be to make an estimate from the results produced by point spread functions corresponding to a predetermined number of rotated states. Even when it is difficult to generate point spread functions rotationally symmetrical to point spread function psfb at an arbitrary rotation angle with respect to point $P_S$ under restrictions imposed by finite frequency bands of the transmission beamformer 190 and reception beamformer 120, finite aperture diffraction limit, and beamformer processing capacity limit, it is possible to estimate the rotation angle of the most suitable dominant wave number vector in an interpolation approximation manner from the beamforming (beamforming) output results of a series of point spread functions that differ in dominant wave number vector direction. It is now assumed that BDa denotes an output signal of the reception beamformer 120 that is derived from point spread function psfa which approximates to point spread function psfb rotated through an angle (θ) of $θ_a$ with respect to point Pc (reference point) as shown in FIG. 9(1), and that BDb denotes an output signal of the reception beamformer 120 that is derived from point spread function psfb which remains unrotated (θ=$θ_b$=0), and further that BDc denotes an output signal of the reception beamformer 120 that is derived from point spread function psfc which approximates to point spread function psfb rotated through an angle (θ) of $θ_c$. As shown in FIG. 9(2), an interpolation function acrth is estimated as a function relative to angle θ. Then, θpk, which may have the maximum absolute value PK, is estimated to perform interpolation, for instance, with a Lagrange polynomial. If weighting factors BWa, BWb, and BWc are equal to (θpk−θb)(θpk−θc)/(θa−θb)(θa−θc), (θpk−θa)(θpk−θc)/(θb−θa)(θb−θc), and (θpk−θa)(θpk−θb)/(θc−θa)(θc−θb), respectively, the maximum value PK based on a Lagrange polynomial can be calculated from the equation below: PK=BWa×BDa+BWb×BDb+BWc×BDc.

If acrth is a quadratic function, θpk can be determined while it is subjected to smooth interpolation. However, θpk can also be determined by performing a simple maximum value judgment procedure in relation to output signals BDa, BDb, and BDc. An estimate can also be made with signals that are obtained by subjecting the outputs BDa, BDb, BDc of the reception beamformer 120 to wave detection and compression. The process described above is similar to an operation that is performed by rotating a point spread function at point Pc (reference point) in angular direction and determining a correlation sample of a space whose angle is a variable by means of interpolation.

Figure 8:
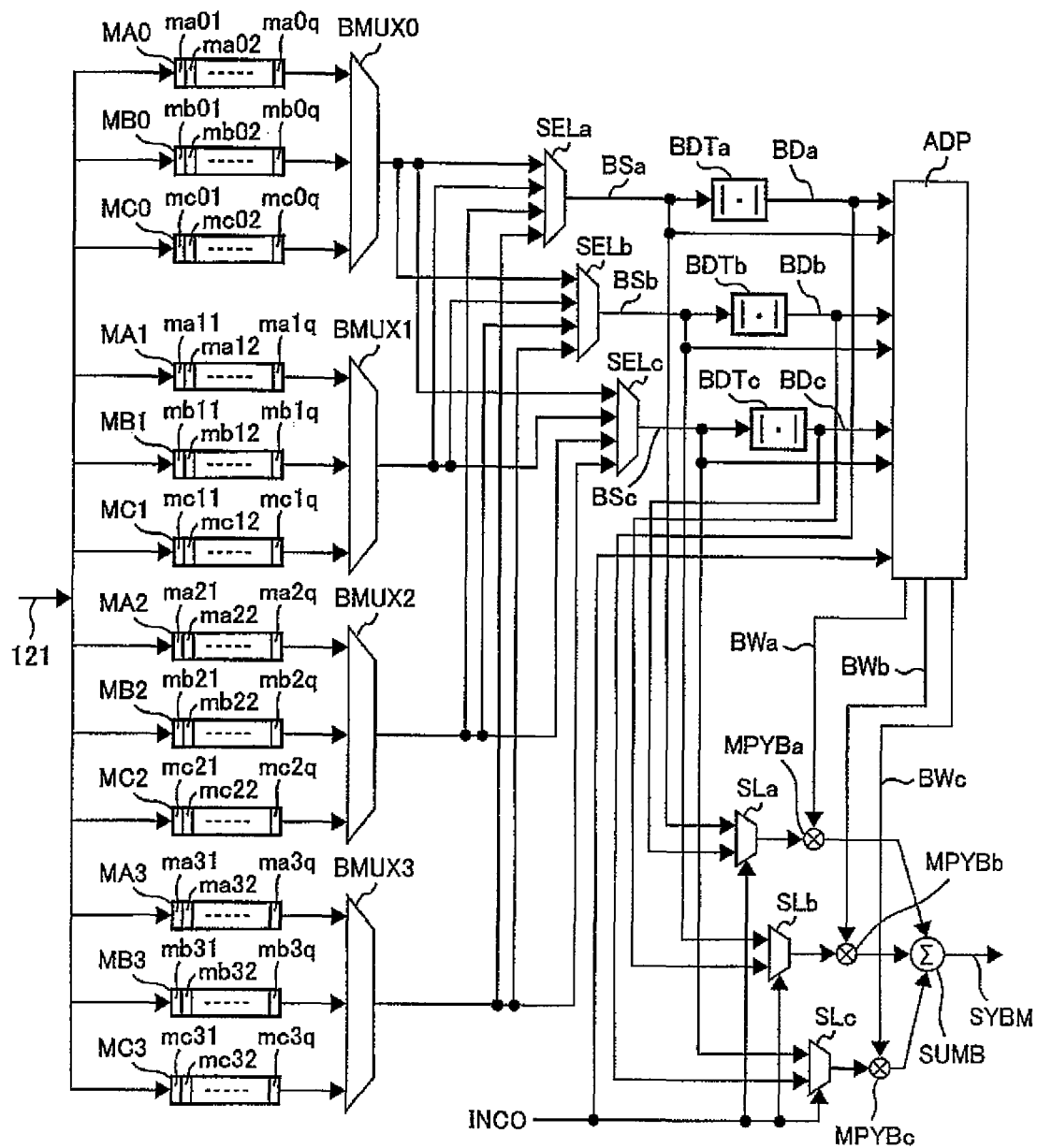
FIG. 8 is a diagram illustrating an adaptive spatial synthesis circuit (second embodiment).

FIG. 8 shows a typical circuit configuration for performing the above-described computations. The configuration shown in FIG. 8 is obtained by adding synthesis signal selection sections SLa, SLb, SLc and a weighting factor computation section ADP to the configuration shown in FIG. 7. The synthesis signal selection sections SLa, SLb, SLc select signals before and after the wave detection/compression sections BDTa, BDTb, BDTc. The weighting factor computation section ADP performs interpolation computations described above. This configuration implements a nonrecursive adaptive process.

In an imaging process in which a coherent addition different from an adaptive process is performed, the synthesis signal selection sections SLa, SLb, SLc connect signals BSa, BSb, BSc, which are not yet subjected to wave detection and compression, to the multipliers MPYBa, MPYBb, MPYBc in accordance with a command INCO. The weighting factors BWa, BWb, and BWc are determined in accordance with a predetermined point spread function.

When the above-described incoherent adaptive process is to be performed, detected/compressed signals BDa, BDb, BDc after the wave detection/compression sections BDTa, BDTb, BDTc are connected to the multipliers MPYBa, MPYBb, MPYBc in accordance with the command INCO. When the output signals BDa, BDb, BDc are input, the weighting factor computation section ADP computes the weighting factors BWa, BWb, BWc in accordance with the above arithmetic expression. The results of multiplications by the multipliers MPYBa, MPYBb, MPYBc are added together in the adder SUMB and output as output signal SYBM.

The above-described process is an example of an estimation process concerning a particular point Pc. However, as local fluctuation of a reflector distribution always occurs, the estimated value of θpk always fluctuates. The weighting factor computation section ADP may store the aspect ratio of an imaging region around point Pc in the imaging plane and the values of BDa, BDb, and BDc within a range that is extended in the distance direction and scanning array direction of a beam, and cause, for instance, a statistical model estimation section to output desirable weighting factors BWa, BWb, BWc for point Pc in accordance with the results of computations on the stored values.

In the embodiments described above, the point spread functions according to the present invention do not limit the signal waveform formation method of the transmission beamformer 190 and reception beamformer 120. The point spread functions according to the present invention are such that the transmission waveform of the transmission beamformer 190 is not limited to a pulse configuration in which energy is consolidated at one point on a time axis. Even when a pulse dispersion/compression process, in which pulses are dispersed on the time axis in the transmission beamformer 190 and compressed in the reception beamformer 120 for process gain improvement purposes, a time encoding transmission process, and a time decoding reception process relative to the time encoding transmission process are performed, the point spread functions are formed in the same manner as in the case of pulses that are not subjected to the above-mentioned processes after being compressed or decoded relative to a point within the imaging region.

When applied to a transmission/reception beamformer (beamforming circuit) of a medical ultrasound imaging device, the present invention implements a system that produces high-quality images.

EXPLANATION OF REFERENCE NUMERALS AND SYMBOLS

400 .... Probe
400A .... Transmission/reception aperture
401 .... Transmission/reception element group
4001, 4002, ..., 400e .... Transmission/reception element
100 .... Beamformer data computation section
200 .... Transmission circuit
190 .... Transmission beamformer
300 .... Transmission/reception separation circuit
210 .... Reception circuit
120 .... Reception beamformer
121 .... Beam output signal
130 .... Scan converter
131 .... Video signal
140 .... Display section
TCPU .... Processor
EXTRAM .... Storage section
$BT_1, BT_2, BT_3$ .... Transmission beam
$BR_1, BR_2, BR_3, BR_4, BR_5$ .... Reception beam
$psf_{1a}, psf_{1b}, psf_{1c}, psf_{2a}, psf_{2b}, psf_{2c}, psf_{3a}, psf_{3b}, psf_{3c}, psf_1, psf_2, psf_3, psf_a, psf_b, psf_c, psf_{1A}, psf_{2A}, psf_{3A}, psf_{1B}, psf_{2B}, psf_{3B}, psf_{1C}, psf_{2C}, psf_{3C}$ .... Point spread function
ra, rb, rc .... Received signal
MA0, MB0, MC0, MA1, MB1, MC1, MA2, MB2, MC2, MA3, MB3, MC3 .... Individual beam memory
BMUX0, BMUX1, BMUX2, BMUX3, SELa, SELb, SELc .... Memory selector
MPYBa, MPYBb, MPYBc .... Multiplier
BWa, BWb, BWc .... Weighting factor
SUMB .... Adder
BSM .... Coherent addition signal
BWa, BWb, BWc .... Weighting factor
SELa, SELb, SELc .... Memory selector
BDTa, BDTb, BDTc .... Wave detection/compression section
OBND .... Boundary
acrth .... Interpolation function
PK .... Maximum value
θ .... Rotation of point spread function
θpk .... Maximum value of θ
SLa, SLb, SLc .... Synthesis signal selection section
BDa, BDb, BDc .... Reception beamformer output signal

The invention claimed is:

1. An ultrasound imaging device comprising:
a plurality of elements that transmit or receive an ultrasound wave;
a transmission beamformer that converges a transmission beam transmitted from the plurality of elements in relation to the plurality of elements; and
a reception beamformer that forms a reception beam in relation to a plurality of reception signals generated upon receipt of a reflected ultrasound wave;
wherein the transmission beamformer or the reception beamformer forms a plurality of point spread functions having different spatial distributions around a transmission focal point or a reception focal point;
wherein the plurality of point spread functions are formed when signals of a transmission/reception element group in a transmission/reception aperture are subjected to transmission and reception sensitivities (weights), and delay time symmetrical from a center on a basis of a same time pulse waveform; and
wherein an image data is formed in accordance with an output of the transmission beamformer or the reception beamformer.

2. The ultrasound imaging device according to claim 1, wherein the plurality of point spread functions spread while having a dominant wave number vector in mutually different directions.

3. The ultrasound imaging device according to claim 1, wherein the transmission beam and the reception beam are formed in substantially the same direction.

4. The ultrasound imaging device according to claim 1, wherein at least one of the plurality of point spread functions has an asymmetrical spatial spreading in a direction parallel to and in a direction orthogonal to the directions of the transmission beam and the reception beam.

5. The ultrasound imaging device according to claim 1, wherein at least one of the plurality of point spread functions becomes distributed while having a dominant wave number vector in a direction parallel to the directions of the transmission beam and the reception beam; and wherein the remaining point spread functions become distributed while having a dominant wave number vector in the direction of angular rotation with respect to the transmission focal point or the reception focal point.

6. The ultrasound imaging device according to claim 1, wherein the outputs of the transmission beamformer or the outputs of the reception beamformer that respectively correspond to the plurality of point spread functions, are weighted to form the image data in accordance with the result of addition of the outputs of the reception beamformer used for transmission/reception.

7. The ultrasound imaging device according to claim 1, wherein the outputs of the transmission beamformer or the outputs of the reception beamformer that respectively correspond to the plurality of point spread functions, are weighted in accordance with the outputs or the wave detection output intensity of the reception beamformer, to form image data in accordance with the result of addition of the outputs of the reception beamformer used for transmission/reception.

8. The ultrasound imaging device according to claim 1, wherein the outputs of the transmission beamformer or the outputs of the reception beamformer that respectively correspond to the plurality of point spread functions, are weighted in accordance with the outputs or the wave detection output intensity of the reception beamformer, to form image data in accordance with the result of weighted addition of the wave detection outputs of the reception beamformer used for transmission/reception.

9. The ultrasound imaging device according to claim 1, wherein each of the plurality of point spread functions is formed at a same transmission/reception aperture position.

10. The ultrasound imaging device according to claim 1, wherein the reception beamformer sets reception beams oriented in a plurality of directions for each transmission, and generates the point spread functions that are differing to each of the reception beams oriented in the plurality of directions, with respect to other reception beams.

11. The ultrasound imaging device according to claim 10, wherein the reception beamformer causes the reception beams oriented in the plurality of directions to overlap with each other.

12. The ultrasound imaging device according to claim 10, wherein a transmission beam and a reception beam are sequentially scanned.

13. The ultrasound imaging device according to claim 1, wherein the reception beamformer performs a plurality of processes on a received signal, based on the result of one transmission.

14. An ultrasound imaging device comprising:
a plurality of elements that transmit or receive an ultrasound wave;
a transmission beamformer that converges a transmission beam transmitted from the plurality of elements in relation to the plurality of elements; and
a reception beamformer that forms a reception beam in relation to a plurality of reception signals generated upon receipt of a reflected ultrasound wave;
wherein the transmission beamformer or the reception beamformer forms a plurality of point spread functions having different spatial distributions around a transmission focal point or a reception focal point;
wherein the point spread functions are derived from a transmission and reception sensitivities (weights), and delay time symmetrical from a center on a basis of a same time pulse waveform; and
wherein an image data is formed in accordance with an output of the transmission beamformer or the reception beamformer.

15. The ultrasound imaging device according to claim 1, wherein the plurality of point spread functions include a first point spread function and a second point spread function that is obtained by rotating the first point spread function around a reference point.

16. An ultrasound imaging device comprising:
a plurality of elements that transmit or receive an ultrasound wave;
a transmission beamformer that converges a transmission beam transmitted from the plurality of elements in relation to the plurality of elements; and
a reception beamformer that forms a reception beam in relation to a plurality of reception signals generated upon receipt of a reflected ultrasound wave;
wherein the transmission beamformer or the reception beamformer forms a plurality of point spread functions having different spatial distributions around a transmission focal point or a reception focal point;
wherein the plurality of point spread functions are formed when signals of a transmission/reception element group in a transmission/reception aperture are subjected to transmission and reception sensitivities (weights), and delay time symmetrical from a center on a basis of a same time pulse waveform; and
wherein an image data is formed in accordance with an output of the transmission beamformer or the reception beamformer.

17. An ultrasound imaging device comprising:
a plurality of elements that transmit or receive an ultrasound wave;
a transmission beamformer that converges a transmission beam transmitted from the plurality of elements in relation to the plurality of elements; and
a reception beamformer that forms a reception beam in relation to a plurality of reception signals generated upon receipt of a reflected ultrasound wave;

wherein the transmission beamformer or the reception beamformer forms, for each point of a plurality of points, a plurality of point spread functions having different spatial distributions around a transmission focal point or a reception focal point of said each point;

wherein the plurality of point spread functions are formed when signals of a transmission/reception element group in a transmission/reception aperture are subjected to transmission and reception sensitivities (weights), and delay time symmetrical from a center of said each point, on a basis of a same time pulse waveform; and wherein an image data is formed utilizing the plurality of point spread functions of said each point of the plurality of points, output from the transmission beamformer or the reception beamformer.

* * * * *